US008656417B2

(12) United States Patent
May

(10) Patent No.: US 8,656,417 B2
(45) Date of Patent: Feb. 18, 2014

(54) INTERFACE FOR TELECOMMUNICATION SERVICES USING UNIFORM RESOURCE IDENTIFIERS

(75) Inventor: Howard J. May, Southampton (GB)

(73) Assignee: Dialogic Corporation, Montreal (CA)

( * ) Notice: Subject to any disclaimer, the term of this patent is extended or adjusted under 35 U.S.C. 154(b) by 380 days.

(21) Appl. No.: 12/836,683

(22) Filed: Jul. 15, 2010

(65) Prior Publication Data
US 2012/0017222 A1 Jan. 19, 2012

(51) Int. Cl.
G06F 9/46 (2006.01)
(52) U.S. Cl.
USPC .......................................................... 719/328
(58) Field of Classification Search
None
See application file for complete search history.

(56) References Cited

U.S. PATENT DOCUMENTS 8,306,021 B2 * 11/2012 Lawson et al. ................ 370/352
2007/0143182 A1 * 6/2007 Faber et al. ..................... 705/14
2009/0254926 A1 * 10/2009 Kim et al. ...................... 719/328
2010/0142516 A1 * 6/2010 Lawson et al. ................ 370/352
2011/0217994 A1 * 9/2011 Hirson et al. .................. 455/466

OTHER PUBLICATIONS

REST API, Zeep Mobile www.zeepmobile.com/developers/documentation/messaging/2008-07-14/rest_api.
REST API: SMS Messages, Twilio Cloud Communications www.twilio.com/docs/api/2010-04-01/rest/sms.

* cited by examiner

Primary Examiner — Van Nguyen
(74) Attorney, Agent, or Firm — Chapin IP Law, LLC

(57) ABSTRACT

An application programming interface (API) provides telecommunication services in the form of a resource modeled as an object, which object can be essentially any coherent and meaningful concept that may be addressed. The API model permits simpler and more intuitive invocation and usage of the API. The object model for the API avoids having to understand service infrastructure for proper API invocation and tends to increase the usability of the service represented by the API. With the object-modeled resource, the device can be made to appear to an application programmer as a webpage, so that interacting with the device is the same as interacting with a webpage, such as by utilizing HTTP requests and responses. The object-model API can increase the ease with which an application programmer can utilize the services offered, as well as increase the ease with which the API may be integrated into an overall communication system.

17 Claims, 2 Drawing Sheets

INTERFACE FOR TELECOMMUNICATION SERVICES USING UNIFORM RESOURCE IDENTIFIERS

CROSS REFERENCE TO RELATED APPLICATION(S)

(Not Applicable)

STATEMENT REGARDING FEDERALLY SPONSORED RESEARCH OR DEVELOPMENT (Not Applicable)

BACKGROUND

The present disclosure relates generally to exposure of telecommunication ("telecom") services as web services, and relates more particularly to providing an application programming interface (API) that models telecom services using a uniform resource identifier (URI).

Application programmers, including application developers for web-based services, often provide users or customers with software platforms that enable various services for the user or customer. For example, an application may be provided to a user of a given website to permit the user to send a text message to a chosen text message address. In such a case, the application programmer provisions the application with the text messaging feature, and exposes various inputs to permit the user to activate the feature to implement the text messaging. The application programmer may implement the service of text messaging based on knowledge of application programming interfaces (APIs) that are offered by various telecom providers of text messaging services. Each telecom provider tends to have proprietary or specific APIs used to invoke the desired services, such as a text messaging service. The application programmer utilizes the APIs provided by the telecom providers, with the appropriate parameters, to invoke a text message service, for example.

Due to the potentially large number of APIs that may be used to implement services from various service providers, some APIs follow a particular paradigm in their invocation and usage. For example, a common paradigm or usage for web-based services that use APIs is referred to as a representational state transfer (REST) style of software architecture. Application software that conforms to REST constraints is typically referred to as being "RESTful." REST-style architectures typically consist of clients and servers. Clients typically initiate requests to servers, which process requests and return appropriate responses. Requests and responses are built around the transfer of "representations" of "resources". A resource can be essentially any coherent and meaningful concept that may be addressed. A representation of a resource typically captures the current or intended state of a resource.

RESTful web service APIs are ubiquitous, used for everything from search engines to social networking web-sites. A RESTful API typically models the "resource" to which a request is applied as part of a uniform resource identifier (URI) web service and the action requested in the HTTP method (GET, POST, DELETE, PUT). Parameters relating to the request can be encoded using XML in the payload of the request. This approach—where the API models the resource—supports the notion of interacting with a tangible object. For example, a request can be made to POST a new feature request to a website, or GET an existing feature. An API with a RESTful format is very familiar to web application developers, and the provision of an API may benefit from having this type of form in accordance with RESTful principles from the standpoint of usability.

Among telecom service providers that might provide different types of telecom services, the APIs are typically non-standard, or proprietary, and may not always correspond to or support a RESTful resource model. Typically, many third party telecom web service providers have unique APIs, some of which may be based on RESTful principles, and which model a service as a resource in the URI. For example, a third party telecom web service provider may model an SMS service with a URI of /<web_server>/sms and a location-based service with a URI of /<web_service>/location_service, where <web_server> represents an IP address of a web server providing the third party telecom web service. With this type of definition for access to an API, an application developer might view the conceptual model of the URI as an SMS transmission engine, or as a location identification agent, respectively. Accordingly, the third party telecom web service provider offers an API that provides access to resources modeled as services.

When the resource is modeled as a service being offered, such as sending an SMS text message, for example, the application programmer typically apprises him/herself of the underlying infrastructure and how the request is to be made. Accordingly, the application programmer learns a number of proprietary or unique interfaces among the different service providers, adding to the complexity and difficulty of provisioning a web-based application with telecom services. It would be highly desirable to obtain a more standardized or readily usable service interface for use with web-based applications.

SUMMARY

The presently disclosed systems and methods provide an API for accessing telecommunication services that models the resource as an object, which object can be essentially any coherent and meaningful concept that may be addressed in a telecommunication network. The object can be referenced using a uniform resource identifier (URI), and the API can be used to submit a service request to an addressable resource in a telecommunication network. Equipment in the telecommunication network can respond to the service request that references the object, such as when the equipment may have status information about the object. The object may be a message destination, i.e., address in the telecommunication network, and can be a communication device, which for example, may be a mobile phone or other mobile device. The API conforms with RESTful principles and provides a conceptually simpler model to permit access to web services. For example, the presently disclosed API provides a resource model that can permit the appearance of the application directly interacting with the object identified in an API access. By modeling the resource as an object, access to the API can be viewed as accessing a webpage dedicated to the object. Retrieving information about the object or providing messages to the object follows the same model as like interactions with a webpage. Accordingly, the presently disclosed API can be conceptually understood more rapidly than previously offered APIs. The conceptual simplicity of the API model contributes to ease of use of the API for integration into web service applications, marking a significant advantage over prior APIs that provide resources modeled as a service.

According to an aspect, the present disclosure provides a telecommunication device that permits access to a communication device, such as a mobile phone or other mobile device, by a web-based application. The telecommunication device includes a processor and memory that are used to execute instructions to implement an API in accordance with the present disclosure. The API exposes an interface that, upon invocation, accepts a URI that identifies the communication device. The application programmer provisions the web-based application with a facility for using a uniform resource locator (URL) that includes the URI identifying the communication device. With such an interface, the API models the desired resource as a device, rather than a service.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

Figure 1:
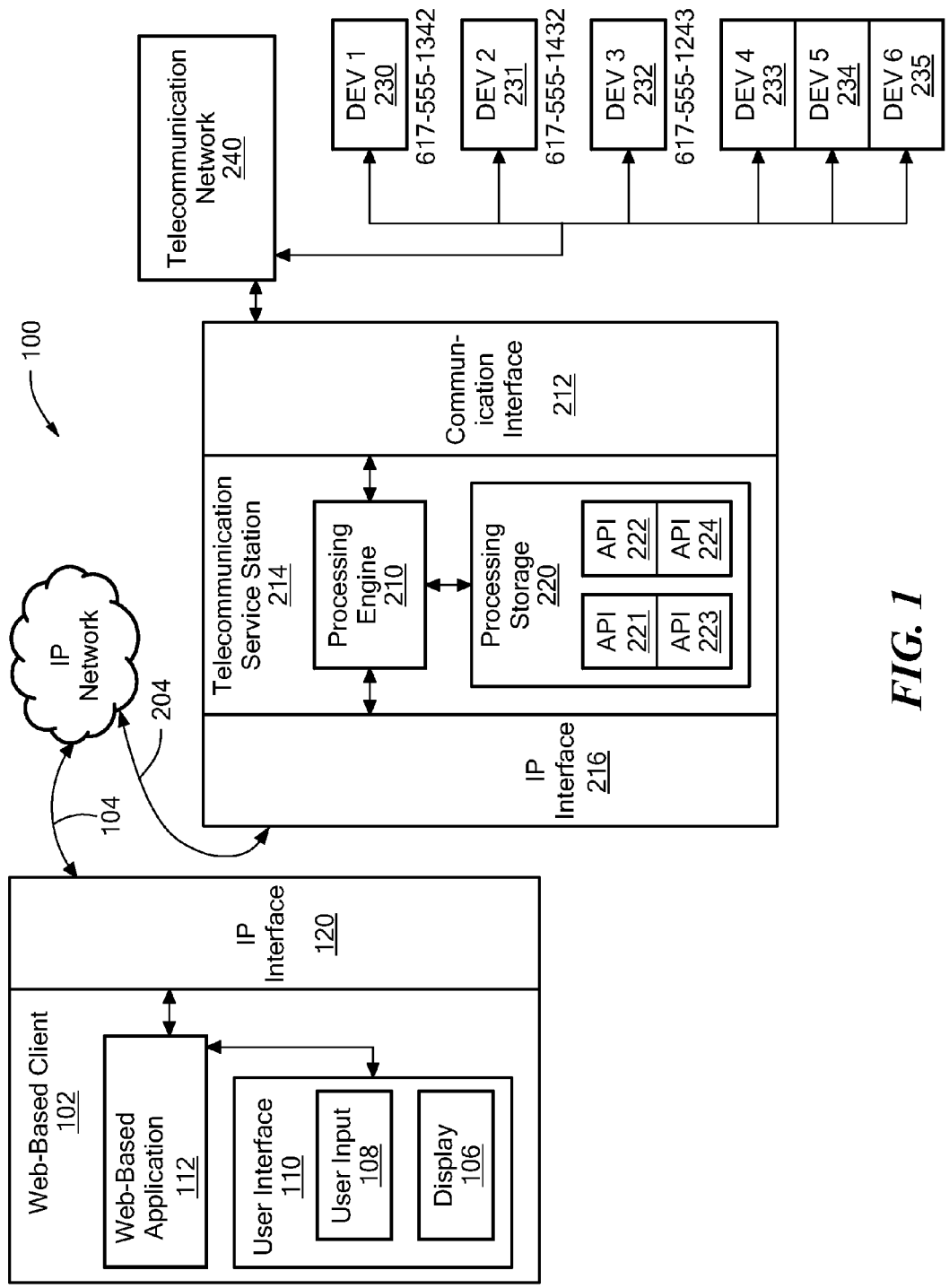
FIG. 1 is a block diagram of an exemplary architecture for exposing telecommunication services to a web-based application.

Referring to FIG. 1, a diagram of an exemplary telecommunication service architecture 100 for exposing telecommunication service as a web service is illustrated. In architecture 100, a web-based client 102 hosts a web-based application 112 that receives input from and provides output to a user interface 110. User interface 110 can be implemented, for example, as a device with a display 106 and a user input mechanism 108, such as might be implemented with a keyboard. Client 102 can be implemented with a PC, a web enabled mobile device, a terminal with a connection to an IP network, or any other type of wireless, mobile or land-line connected device capable of interacting with web-based application 112. User interface 110 can send messages to and receive messages from web-based application 112 to permit the exchange of commands and/or data. Although client 102 is illustrated in the exemplary embodiment of architecture 100 as hosting web-based application 112 and user interface 110, these two components need not be co-located or co-hosted. For example, client 102 may be implemented as a server hosting web-based application 112, which communicates with user interface 110 at a remote location. Thus, web-based application 112 can be implemented to be a network application that exposes web pages to users for input/output, and that interacts with a telecommunication service, as discussed further below.

Client 102 includes an IP interface 120 that is used to send and receive messages over an IP network connection 104. Upon receiving a prompt from user interface 110, web based application 112 can provide service requests to IP interface 120, which service requests are then directed over IP network connection 104 to the desired address specified by web based application 112. According to an exemplary embodiment, such an address is provided in the form of a URL that identifies a telecommunication service station 214; and the URL includes a URI that identifies a specific communication device that is the ultimate target of the service request.

Station 214 can provide various telecommunication services, including text messaging. It should be understood that station 214 may be provisioned to offer a broad range of telecommunication services, including voice and data communications, streaming communications including voice and video, and any other type of information that might be communicated over a telecommunication network. Generally, station 214 exposes application programming interfaces (APIs) 221-224 that can be invoked to call for services provided by station 214. Generally, any number of APIs 221-224 may be provided in station 214, including, for example, a number greater or less than what is shown and described herein, with APIs 221-224 serving as non-limiting illustrative examples. APIs 221-224 provide an interface construct for specifying the type of service and service parameters that web-based application 112 might seek to invoke. Accordingly, web-based application 112 has knowledge or intelligence concerning the constructs of one or more of APIs 221-224 provided by station 214 to permit web-based application 112 to invoke one or more of APIs 221-224. As an example of an implementation, API 221 may include an API name or identifier for invoking API 221, as well as a specific arrangement of data or parameters that might be expected by API 221 for proper invocation. Once web-based application 112 invokes API 221, station 214 performs the actions indicated by API 221, using any attendant data or commands provided with the invocation, to implement the desired service.

Station 214 includes a processing engine 210 and processing storage 220 that operate together to provide the desired services. Processing storage 220 includes APIs 221-224, which are program modules in the form of instructions that are executable by processing engine 210. Web-based application 112 can invoke an API 221, for example, by sending an invocation message through IP network connection 104 via IP interface 120. The invocation message is delivered to IP interface 216 via network connection 204. Processing engine 210 receives the invocation message through IP interface 216 and executes API 221 as identified by the exemplary API invocation.

Station 214 includes a communication interface 212 that provides access to a telecommunication network 240, which is composed of equipment and devices (not shown) that can provide telecommunication services, including connectivity and access to communication devices 230-235, as is generally known in the art. Telecommunication network 240 provides connectivity with addressable objects, which objects may be a message destination, a network device such as communication devices 230-235 that can be queried, or any other addressable function provided by telecommunication network 240. Examples of addressable objects or functions include SIM cards and short codes, which need not be associated with a specific device. When API 221, for example, is executed, processing engine 210 sends messages through communication interface 212 to telecommunication network 240 to implement the service request. Equipment in telecommunication network 240 may be able to respond to the service request, even if the request is directed to one or more of devices 230-235. Alternately, or in addition, the targeted communication device of devices 230-235 may respond to the service request.

APIs 221-224 exposed by station 214, upon invocation, execute operations to implement the desired services. Examples of some of the services that APIs 221-224 may represent include SMS text messaging, device location queries, and any other types of services that may be provisioned in telecommunication network 240 and/or devices 230-235 that station 214 can access for actuation. As processing engine 210 executes API 221, for example, messages are sent through communication interface 212 to telecommunication network 240 for implementation of the requested.

Telecommunication network 240 provides a connection for communicating with one or more of the devices 230-235, and may involve any typical known communication technique or protocol, as desired or as indicated by devices 230-235. For example, device 235 may have an RF connection with service interface 212, such as may be provided in the case of a wireless mobile device. Device 234 may have an IP network connection to service interface 212, while device 233 may have a landline telephone connection to service interface 212. Typically, station 214 may implement a service interface 212 that can be expanded to include most types of communication techniques and/or protocols. It should be understood that devices 230-235 are shown for illustration purposes, and the number of devices is not limited to—and thus can be greater or less than—the number of devices shown.

In accordance with the disclosed systems and methods, APIs 221-224 in processing storage 220 model a resource in telecommunication network 240 and/or model one or more devices 230-235 as a resource. This modelling approach treats the resource as an object, rather than as a service, to simplify the invocation of APIs 221-224 by web-based application 112. Web-based application 112 and user interface 110 permit a user to invoke an API 221, for example, of station 214 through web-based client 102. Accordingly, an application programmer provisions web-based client 102 with a facility for invoking API 221 through the configuration and arrangement of web-based application 112. The application programmer configures web-based application 112 to accept a prompt, such as through user interface 110, to make the API invocation using parameters such as those supplied or indicated by a user through user interface 110.

The API invocation has a particular form as specified by the configuration of the API that is invoked. When the application programmer configures web-based application 112 in web-based client 102, user interface 110 may be set up to have display 106 show a template with fields that can be filled-in in accordance with the user invocation to make the API call. The data provided to the template, such as by operation of user input 108, can provide the parameters used for an API invocation in keeping with the specification for invoking the given API. The parameters may be drawn from additional or alternative sources, so that user input 108 may be used to initiate the service request with preselected or inferred parameters. For example, user interface 110 or web-based application 112 may have access to parameter values such as telephone numbers from a database. In such a case, the user may initiate a service request with predetermined parameters rather than inputting the parameters through user input 108.

In accordance with the presently disclosed systems and methods, the form of the template and/or API call or invocation is arranged in accordance with the invoked resource modeled as an object rather than as a service. The invocation of the resource through the given API therefore appears as the invocation of an object, rather than as the invocation of a service for the application programmer configuring web-based application 112 in web-based client 102. APIs 221-224 that are invoked in accordance with this exemplary arrangement are configured to accept an invocation formatted in accordance with a resource modeled as an object. Thus, the invocation of APIs 221-224 appears to the application programmer as the invocation of a service in relation to an object, rather than as an invocation of a service based on a resource modeled as a service.

API 221, for example, in processing storage 220 is executed by processing engine 210 upon invocation to provide the service indicated by the invocation of API 221. For example, if web-based client 102 invokes API 221 to send a text message to device 230, web-based application 112 provides a call to API 221 in the form of a device identifier coupled with the service invocation. Upon execution of API 221 being invoked, processing engine 210 causes messages to be sent through service interface 212 to device 230 using the identifier provided in the formatted API invocation. Processing engine 210 then supplies the information provided in the API invocation to device 230 in accordance with the content of the API invocation.

Example 1

In accordance with the disclosed systems and methods, an exemplary format of an API invocation to send a text message to an object, such as a communication device, which may be a mobile phone for example, has the following form.

HTTP URL: http://web-service/6175551342/sms_inbox
HTTP Method: PUT
Request HTTP Payload: <text>Happy Birthday!</text>

In this EXAMPLE 1, the URI addresses a resource using the ten digit telephone number 617-555-1342. Accordingly, the service request is directed, or addressed, to a resource modeled as an object, in this case a mobile phone. The mobile phone and the mobile phone inbox are modeled as a URL, and web-based application 112 makes an HTTP PUT request to the inbox of the mobile phone to send the text message found in the HTTP payload. In this example, user interface 110 may have an input field to permit the user to input the text message payload, and the telephone number of the mobile phone to which the text message is to be directed. When the user provides an input to indicate that the text message is to be sent, the API invocation is made to station 214, which is identified with the exemplary placeholder "web_service", which may be provided as an IP address of station 214 in the URL of the API invocation. Processing engine 210 in station 214 receives the API invocation of the present example and executes API 221 out of processing storage 220. The parameters of the exemplary API invocation are used in the API execution to cause the service request to be implemented. Processing engine 210 provides the signaling and data to send a text message through communication interface 212 to the device identified in the API invocation, in this EXAMPLE 1, device 230.

Example 2

In this EXAMPLE 2, web-based application 112 receives a text message that might be displayed on display 106 of user interface 110. The text message service may be invoked with the following API call.

HTTP URL: http://web_service/6175551432/sms_inbox
HTTP Method: GET
Response HTTP Payload: <text>Meet at Dave's</text>

In this example, the text message is provided by device 231, which might be a mobile phone, for example. API 221, for example, is invoked with the URI for device 231, which is the object modeled by the invocation of API 221. Web-based application 112 sends a request to and receives a response from device 231 using the URI in the API invocation, i.e., "6175551432." The reference "web_service" is a placeholder used to address station 214 for API 221 which is invoked using the GET method to obtain the text message payload indicated. The response is provided to web-based application 112 through station 214 in accordance with the sms_inbox parameter for device 231. As in EXAMPLE 1, it is the object (URI of device 231) that is modeled as the resource for API invocation, with methods being applied to the modeled object in accordance with this API invocation.

Example 3

In this EXAMPLE 3, a request is made to device 232 to obtain location information. Device 232 represents a mobile phone, for example, that can be addressed using a telephone number. API 222 is invoked, for example, and the API invocation can take the following form.

HTTP URL: http://web_service/6175551243/location
HTTP Method: GET
Response HTTP Payload: <location>"location information"</location>

As with the previous EXAMPLE 1 AND EXAMPLE 2, the placeholder value "web_service" indicates a parameter value, such as an IP address, that addresses station 214, while the telephone number "6175551243" provided in the HTTP URL addresses device 231 for the location request. API 222 uses the HTTP GET method to request the location of the object indicated in the URI. Telecommunication network 240 responds by providing the HTTP response payload with the requested location information. The response is provided to communication interface 212, and forwarded by processing engine 210 to web-based client 102, where the location information might be provided on display 106 of user interface 110 by web-based application 112.

In each of the above EXAMPLE 1, EXAMPLE 2 and EXAMPLE 3, the API invocation is based on a resource that is modeled as an object, rather than a service. The API model for the object permits interaction with web-based application 112 so that the application appears to be directly interacting with the object of interest. One way this API model might be viewed is as if each object is assigned a webpage, so that interacting with the object is the same as interacting with a webpage. A webpage is an interface construct that generally permits a user to interact with an application, such as a web-based application. The API model addresses the object as the principle resource rather than the abstract service as the principle resource, leading to simplicity and ease of use for API 221-224 in accordance with the present disclosure.

Figure 2:
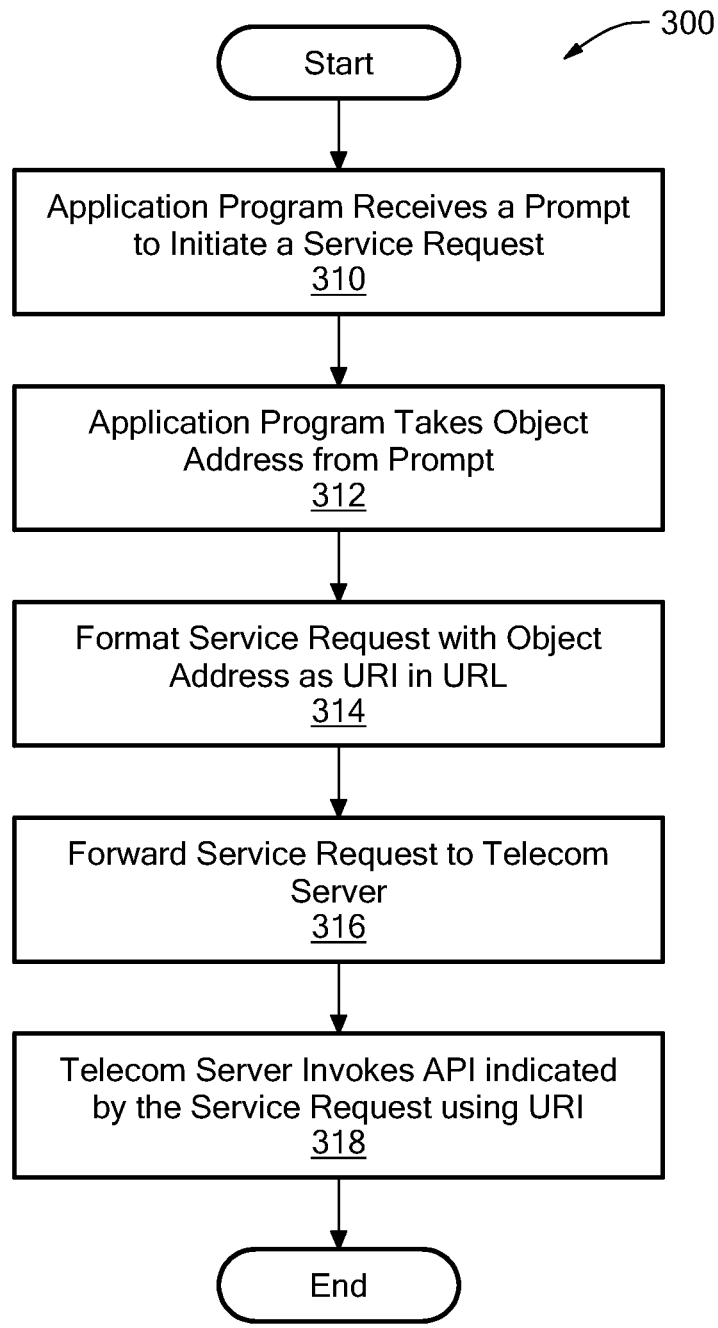
FIG. 2 is a flowchart illustrating an exemplary web-based application invoking a telecommunication service of a communication device.

Referring now to FIG. 2, a flowchart 300 illustrates an exemplary process for an application program that invokes a telecommunication service of a communication device in accordance with the present disclosure. A block 310 illustrates the receipt of a prompt by the application program to initiate a service request. Such a prompt might be provided by a user interacting with user interface 110 (FIG. 1) to supply parameters for a service request and initiate the request. Once the operation indicated in block 310 executes, the application program parses the prompt to obtain an object address for use in constructing the API call, as illustrated in a block 312. Once the operation illustrated in block 312 executes, the application program, such as web-based application 112 (FIG. 1) formats the service request as an API call with the object address provided as a URI in a URL, as indicated in a block 314. When the service request is formatted, as indicated in block 314, the application program forwards the service request to the telecommunication server, such as station 214 (FIG. 1), as illustrated in a block 316 of flowchart 300. Once the service request is forwarded to the telecommunication server as indicated in block 316, the telecommunication server invokes the API specified in the service request, using the URI parameter(s) as input for the API execution, as indicated in a block 318. The service request is subsequently provided to the object address in the URI that was provided, at least in part, by the user, in accordance with the communication technique or protocol used between the addressed object and the telecommunication server.

With the process illustrated in flowchart 300, the application programmer can provision the application program with a facility to accept an object address, such as a telephone number, and direct the service requests to the addressed object. Such a facility is conceptually easier to understand and more in line with generally familiar principles, i.e., RESTful principles, than prior API models that model a resource as a service. This facility can lead to more rapid prototyping and/or development of an application program that provides access to telecommunication services, as well as simplify maintenance.

The API model of the present disclosure exhibits characteristics in accordance with RESTful principles, so that invocation is aligned with generally familiar, or more intuitive usages, and is thus more appealing to application programmers. An API that can be quickly understood and implemented can provide a significant advantage for an application programmer tasked with dealing with multiple service providers and highly integrated systems. For example, if an application programmer can provide an API invocation based on an operation on a modeled object, the application programmer's job can become more simplified and can potentially be completed more rapidly than would be the case if/when providing API calls that expose services. For example, an API model that exposes services may expose unnecessary details about the underlying infrastructure behind the service, so that applications interact with infrastructure rather than the object itself. Such a service-oriented API can be difficult to understand and/or implement if it is based on obtaining knowledge of a service with which a device is provisioned.

The operations herein described are purely exemplary and imply no particular order. Further, the operations can be used in any sequence when appropriate and can be partially used. With the above embodiments in mind, it should be understood that the in accordance with the present disclosure there can be employed various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared and otherwise manipulated.

Any of the operations described herein that form part of the present disclosure are useful machine operations. The present disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can be thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of the present disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the function described herein may be performed by a processor executing program instructions out of a memory or other storage device. Therefore, it is the object of the appended claims to cover all such variations and modifications as come within the true spirit and scope of the present disclosure.

What is claimed is:

1. A telecommunications device for providing an application with access to telecommunications services in a telecommunications network, one or more mobile devices being communicably coupled to the telecommunications network, the telecommunications device comprising:
    a processor communicatively coupled to a storage memory, the processor being operative to access and execute instructions stored in the storage memory, the processor being further operative to execute instructions in accordance with an application programming interface (API);
    a network interface coupled to the processor for receiving messages from and sending messages to the application; and
    a telecommunications interface coupled to the processor for receiving messages from and sending messages to the one or more mobile devices over the telecommunications network;
    wherein the processor is further operative to execute the instructions stored in the storage memory:
        to receive, from the application via the network interface, an API invocation in a format that includes at least a uniform resource locator (URL) and a service request method, the URL including a resource identifier that addresses a respective mobile device communicably coupled to the telecommunications network, and
    wherein the processor is further operative to execute the instructions in accordance with the API;
        to address, via the telecommunications interface, the service request method to the respective mobile device using the resource identifier included in the URL of the API invocation.

2. The device according to claim 1, wherein the respective mobile device is operative to respond to the service request method.

3. The device according to claim 1, wherein the mobile device is a mobile phone.

4. The device according to claim 3, wherein the URI resource identifier includes a telephone number associated with the mobile phone.

5. The device according to claim 1, wherein the resource identifier is implemented as a uniform resource identifier (URI), and wherein the URL includes the URI.

6. The device according to claim 1, wherein the mobile device is addressed as a resource in the URL.

7. The device according to claim 1, wherein the API is directed to sending messages to or receiving messages from the mobile device.

8. The device according to claim 1, wherein the API is constructed in accordance with RESTful principles.

9. A method of a telecommunications device for providing an application with access to telecommunication services in a telecommunications network, one or more mobile devices being communicably coupled to the telecommunications network, the telecommunications device including a processor communicatively coupled to a storage memory to access and execute instructions stored in the storage memory in accordance with an application programming interface (API), the method comprising:
    receiving, at the processor from the application via a network interface, an API invocation in a format that includes at least a uniform resource locator (URL) and a service request method, the URL that addresses a respective mobile device communicably coupled to the telecommunications network;
    invoking, by the processor, the API in response to the API invocation; and
    addressing, by the processor via the telecommunications interface, the service request method to the respective mobile device using the resource identifier included in the URL of the API invocation.

10. The method according to claim 9, wherein the mobile device is a mobile phone.

11. The method according to claim 10, wherein the resource identifier includes a telephone number associated with the mobile phone.

12. The method according to claim 9, wherein the resource identifier is implemented as a uniform resource identifier (URI), and wherein the URL includes the URI.

13. The method according to claim 9, further comprising: addressing the mobile device as a resource in the URL.

14. The method according to claim 9, further comprising: communicating a message between the application and the mobile device.

15. A method of a computer for providing an application with access to telecommunications services in a telecommunications network, one or more mobile devices being communicably coupled to the telecommunications network, the computer including a processor communicatively coupled to a storage memory to access and execute instructions stored in the storage memory in accordance with an application programming interface (API), the method comprising:
    receiving, at the processor from the application, an API invocation in a format that includes at least a uniform resource locator (URL) and a service request method, the URL including a resource identifier that addresses a respective mobile device communicably coupled to the telecommunications network, the API modeling the respective mobile device as a resource in the telecommunications network; and
    addressing, by the processor using the resource identifier included in the URL of the API invocation, the service request method to the respective mobile device modeled as the resource in the telecommunications network.

16. The method according to claim 15 further comprising:
    providing, by the processor, a message to a telephone number associated with the respective mobile device in the telecommunications network, wherein the resource identifier is implemented as a uniform resource identifier (URI), and wherein the message includes the URI.

17. The method according to claim 16, further comprising:
    providing the message to a communication device as a mobile device address.

* * * * *